Patented Feb. 12, 1929.

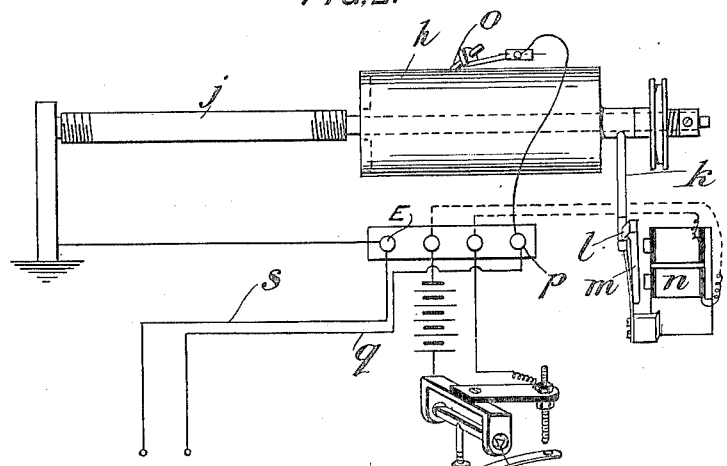
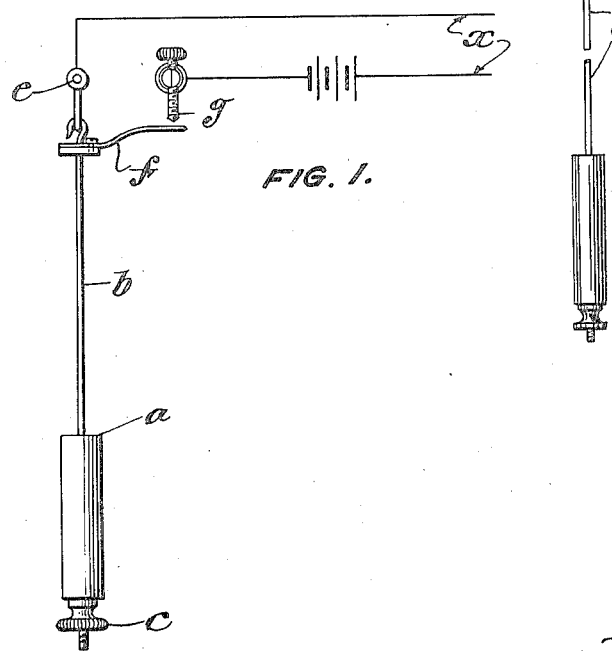

1,701,966

UNITED STATES PATENT OFFICE.

THOMAS THORNE-BAKER, OF LONDON, ENGLAND, ASSIGNOR OF ONE-THIRD TO CHARLES HENRY WATSON AND ONE-THIRD TO FREDERICK WILLIAM WATSON BAKER, BOTH OF LONDON, ENGLAND.

SYNCHRONIZING THE TELEGRAPHING OF PICTURES.

Application filed December 10, 1925, Serial No. 74,590, and in Great Britain December 11, 1924.

This invention comprises improvements in and connected with methods of and means for the telegraphic transmission of pictures, diagrams and other impressions, and an important object of the invention is to provide a simple and efficient method of and means for synchronizing the drums at the transmitting and receiving stations. The need for such a method and means is particularly important when considering the requirements in connection with the wireless broadcasting of pictures, for it must be rendered possible for any person possessing a receiving and recording apparatus to be able to make simple preparations for reception, including synchronization, even although he may be a novice or merely a casual operator.

According to this invention, the synchronization is effected by the aid of pendulums timed to oscillate once, per predetermined unit of time, as for example, once every two seconds, and to complete a release circuit at the end of every complete oscillation. The importance in the adaptation of the use of a pendulum for the purpose, is that by employing a pendulum calculated to have the rate of oscillation above referred to, such pendulum when set oscillating will continue to swing with sufficient accuracy for the whole period required for the transmission and reception of a normal picture. In the specification of my United States Patent No. 1,614,339, dated Jan. 11, 1927, I have described a self-contained machine and power motor, which is adapted so that one power storage is sufficient for driving the machine during the whole period of time occupied for the transmission or reception of a normal picture. The pendulum synchronizer in like manner will exercise its control during that same period without requiring any attention beyond the initial impulse imparted to it.

Both the transmitter and receiver cylinders or drums are run at a speed of, say, one revolution in one and seven eighths seconds, and are arrested at the end of each revolution by a stop which is releasable upon the release circuit being completed by the pendulum.

In connection with line telegraphy, it is possible for signals to be transmitted, just prior to the picture transmission taking place, whereby the receiver can bring his pendulum about into step with the similar pendulum at the transmitting station. In connection with the wireless broadcasting of pictures, a convenient method would be for a telephonic announcement to be given of the beats of the master pendulum at the transmitting station, so that operators at all receiving stations could bring their pendulums about into step with such master pendulum.

In order to enable the invention to be readily understood, reference is made to the accompanying drawings illustrating suitable arrangements, in which drawings:—

Figure 1 is a diagram of a pendulum arrangement adapted for making timed contacts for the intermittent completion of a stop-release circuit.

Figure 2 is a diagram of an installation adapted for the wireless transmission or reception of pictures.

Referring to Figure 1, the pendulum may comprise a bob $a$ supported on a rod $b$ by an adjustment $c$, the rod $b$ being pivotally suspended from a short link $d$ which is suspended from the fixed pivot $e$. At its upper end, the rod $b$ is fitted with a flexible blade contact $f$ which, at the end of the rightward swing of the pendulum, makes contact with a fixed terminal contact $g$. The latter and the pivot $e$ are seen to be connected in a circuit $x$ which may be a relay circuit controlling the operation of a release magnet, or the circuit $x$ may be the circuit of the magnet windings themselves. In the specification belonging to my concurrent patent application aforesaid, I have described a stop device adapted for arresting the transmitting or recording drum at each revolution, the stop device being released by an electromagnet, when the latter is energized under control of a relay receiving a reverse current over the line. In Figure 1, it will be understood that the circuit $x$ may be the circuit of that relay. As an example, the bob of the pendulum may have a weight of, say 28 lbs., and the length of the suspension rod may be about 29 inches and the pendulum may be adjusted to oscillate once every two seconds. The method of employing the pendulum will be hereinafter described.

Referring to Figure 2 which illustrates the apparatus employed either at a transmitting or receiving station, it will be seen that a drum $h$ is fitted with a screw threaded axle portion $j$ and a plain axle portion carrying a radial arm $k$ which is arrested at every revolution by a stop $l$ on an armature $m$ of an electromagnet $n$. At the transmitting station the drum $h$ supports the picture and a stylus indicated at $o$ traverses the prepared picture. This stylus may be understood to be supported on a carriage having feed engagement with the screw $j$ as described in the specification of my concurrent patent application.

The stylus $o$ is connected to the terminal board $p$ of a wireless transmitting set, and the drum $h$ which is of metal, also is earthed. The picture placed around the drum $h$ may be a photograph produced in known manner by printing in fish glue or suitable medium on metal foil, so that the picture is impressed in the form of dots or lines of glue or other medium. Thus, the stylus $o$ in moving over the picture is sometimes in electrical connection with the drum $h$ and sometimes not, as is now well-known in this art. From this it will be apparent that the resistance varies between the stylus $o$ and earthed drum, and this controls the signals transmitted by the set.

At the receiving station, a similar apparatus is used as a receiving set and the stylus $o$ is connected so that the amplified currents due to the signals received are passed through a prepared sheet wrapped around the metal drum $h$ and by electrolyzing the preparation on the paper in known manner, the picture transmitted by the transmitting apparatus will be reproduced on the sheet on the drum $h$ of the receiving apparatus.

In connection with both the transmitting and receiving installations, there is a pendulum device similar to that illustrated in Figure 1, and the contacts $f$ and $g$ are shown as being in the circuit of the magnet coils $n$ although they may be in a relay circuit as hereinbefore described.

In operation, the transmitting station may make a telephonic announcement of intention to transmit a picture, and this would be followed by a calling out of the beats of the master pendulum, so that the pendulums of all receiving stations may be brought into step. The drums $h$ at all stations are suitably driven, as by a spring motor, under speed control so that they make a revolution in, say, one and seven eighths seconds, the pendulums being adapted for performing each complete oscillation in two seconds. Thus, when the transmission takes place, the drums $h$ will be arrested at the end of each revolution, just in advance of the release effected by the pendulums. This release is effected at the completion of the rightward swings when the contacts $f$ engage the contacts $g$ and make the circuits of the magnet coils $n$ which attract the armatures $m$ and remove the stops $l$ from the paths of the arms $k$. The method of transmission and reproduction by the aid of a stylus on metal foil at the transmission station and electrolytically on prepared paper at receiving station may be substituted by a method involving the use of light projection such as the method described in the specification belonging to my patent No. 1,692,232 dated Nov. 20, 1928 of even date herewith.

With apparatus of the character hereinbefore described it is possible to attain such an economy in manufacture and accuracy and simplicity in operation, as to render it possible for the apparatus to be available for purchase and use by individuals having radio receiving sets within range of so-called broadcasting stations.

A clock movement may, of course, be associated with the pendulum in order that the standard oscillation of two seconds duration may be determined positively at any receiving station. Moreover, the contact breakers associated with the pendulums would be appropriately adjustable for ensuring simultaneous make and break by similarly timed pendulums.

I claim:—

1. Mechanism for synchronizing sending and receiving apparatus in the telegraphing of pictures, comprising a drum, means for rotating said drum, a stop on said drum, stop engaging means normally in the path of said stop to arrest the drum at the end of every revolution, an electrical release device in a local circuit for said stop engaging means, a pendulum controlling the circuit of said release device, and switching means operated by the pendulum once only in each complete oscillation thereof for closing said circuit to release said stop engaging means from engagement with the stop and permit the drum to continue its rotation.

2. Mechanism for synchronizing sending and receiving apparatus in the telegraphing of pictures, comprising a drum, means for rotating said drum, a stop on said drum, stop engaging means normally in the path of said stop to arrest the drum at the end of every revolution, an electrical release device for said stop engaging means, a pendulum controlling the circuit of said release device, and a flexible blade contact mounted on the upper end of said pendulum and in the plane of swing thereof, said contact being adapted for closing said circuit to release said stop engaging means from engagement with the stop and permit the drum to continue its rotation.

3. Mechanism for synchronizing sending and receiving apparatus in the telegraphic transmission of pictures and other impressions, the receiving apparatus comprising a revoluble drum, a self contained power storage motor device having a storage capacity adapted for driving such drum during the complete transmission of any normal picture, a stop on said drum, stop engaging means normally in the path of said stop to arrest the drum at every revolution, a local circuit, an electrical release device in said local circuit for said stop engaging means, a pendulum controlling the circuit of said release device, and means for causing said pendulum device to complete each oscillation in a fraction of a second longer than the time occupied by the drum for the drum for the performance of each of the number of cycles required for the transmission.

THOMAS THORNE-BAKER.